Sept. 11, 1962   W. H. INGERSOLL ETAL   3,053,090
APPARATUS FOR INDICATING COMFORTABLE AND UNCOMFORTABLE
RANGES IN TEMPERATURE AND HUMIDITY
Filed Aug. 31, 1959

INVENTORS
Ward H. Ingersoll
Ross Rambeau
BY Robert M. Dunning
ATTORNEY

United States Patent Office 3,053,090
Patented Sept. 11, 1962

3,053,090
APPARATUS FOR INDICATING COMFORTABLE AND UNCOMFORTABLE RANGES IN TEMPERATURE AND HUMIDITY
Ward H. Ingersoll, St. Paul, Minn., and Ross Rambeau, Willoughby, Ohio; said Ward H. Ingersoll assignor to Ross Rambeau
Filed Aug. 31, 1959, Ser. No. 837,186
6 Claims. (Cl. 73—336)

This invention relates to an improvement in apparatus for indicating comfortable and uncomfortable ranges in temperatures and humidity and deals particularly with a device capable of providing an indication of comfort and discomfort ranges at existing temperatures and humidity conditions.

It is a known fact that temperature alone does not determine whether the average person is comfortable or uncomfortable. Under the same conditions of air movement, cooler air at a higher humidity may provide substantially the same degree of comfort as dry air at a higher temperature. It is a purpose of the present invention to provide an indicator controlled by variations in temperature as well as by variations in humidity and which will disclose whether or not the existing conditions are comfortable or uncomfortable to the average person.

A feature of the present invention resides in the provision of an indicator which, in preferred form, comprises in effect two elements which operate either in unison or in opposition. Increases in temperature and reductions in the percentage of humidity tend to maintain the indicator in the comfort zone as do reductions in temperature and increases in humidity. On the other hand, increases in temperature accompanied by increases in humidity as well as decreases in temperature accompanied by decreases in humidity tend to move the indicator from the comfort zone.

A feature of the present invention resides in the simplicity of the apparatus. In one form of construction, the device comprises a pair of discs or dials pivotally supported in cooperable relation. A device such as a coil or bimetal is connected to one disc to pivot the disc in one direction upon increases in temperature and pivot the disc in the opposite direction upon decreases in temperature. A device sensitive to variations in humidity, such as a bimaterial coil having a coating on one surface thereof capable of expanding or contracting on variations of humidity is connected to the other disc to pivot the disc in the one direction upon a decrease in humidity and in the opposite direction upon increases in humidity. A comfort zone area is marked off on one of the discs and a cooperable pointer is provided on the other disc which is cooperable with the comfort zone indication. By noting the relative position of the discs under variations of temperature and humidity, the observer may note whether or not the existing temperature and humidity conditions are conducive to comfort.

A further feature of the present invention resides in the provision of fixed temperature and humidity scales cooperable with the discs so that the temperature and percentage of moisture in the air may be noted.

A further feature of the present invention resides in the simplicity of construction of the apparatus. Because of this simplicity and the small number of parts employed, the device may be produced in volume at a relatively low cost of production.

A feature of a modified form of construction resides in the provision of a bimetallic coil which is sensitive to variations in temperature and which is provided on one surface with a coating or layer of another material capable of expanding and contracting under variations of humidity. The coil is so formed that increases in temperature tend to offset reductions in humidity and decreases in temperature tend to offset increases in humidity. On the other hand, increases in temperature accompanied by increases in humidity have a tendency to move the indicator in one direction while decreases in temperature accompanied by decreases in humidity have a tendency to move the indicator in the other direction.

These and other objects and novel features of the present invention will be more clearly and fully set forth in the follow specification and claims:

In the drawings forming a part of the specification:

Figure 2:
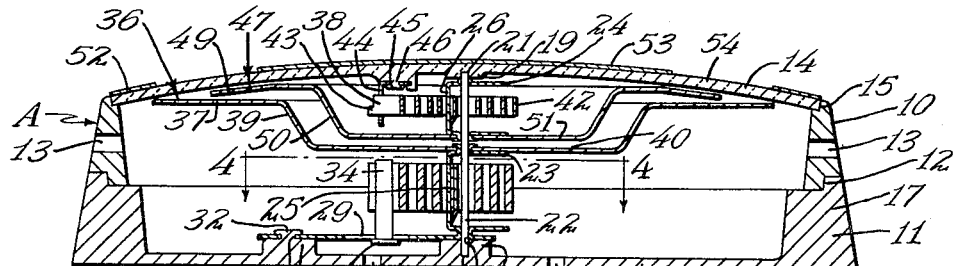
FIGURE 2 is a sectional view on a vertical plane through the indicator shown in FIGURE 1.

With particular reference to FIGURE 2 of the drawings, the indicator, which is indicated in general by the letter A, includes an outer housing having an upper ring shaped portion 10 and a lower cup shaped portion 11 which fit together along a rabbeted edge 12. Apertures 13 may be provided in the housing walls and base to permit circulation of air. A transparent disc 14 having a convex upper surface is marginally seated in a groove 15 at the upper edge of the upper section 10. The disc or dial 14 forms the top closure for the casing.

The lower portion 11 of the housing includes a bottom panel 16 provided with an upwardly extending peripheral wall 17 which supports the top section 10. A boss 18 projects upwardly from the center of the bottom panel 16 and an opposed boss 19 extends downwardly from the center of the dial 14. The bosses 18 and 19 are provided with aligned sockets 20 and 21 respectively to accommodate a pivot shaft 22. The pivot shaft 22 supports a pair of U-shaped yokes or brackets 23 and 24 having vertical base sides 25 and 26 and having extruded openings in the horizontal parallel sides which accommodate the pivot shaft 22. The yokes 23 and 24 are free to rotate about the pivot shaft and each yoke is anchored to the end of a spiral coil. The base of the yoke 23 is connected to the inner end of a coil 27 of thin sheet metal or the like having on one surface thereof a coating of material capable of expanding or contracting under variations in humidity. Thus the bimaterial spiral coil acts upon variations in humidity much in the manner in which a bimetal coil acts upon variations in temperature. If preferred, opposite surfaces of the coil could be coated with material, the coating on one side tending to expand with increases in moisture and the coating in the other side tending to contract upon increases in moisture.

An anchoring strip 29 overlies the boss 18 and is provided with an aperture 30 therethrough through which the pivot shaft 22 extends. The other end of the strip 29 is also provided with an aperture 31 therethrough designed to accommodate a shank 32 formed on the upper end of a boss 333, the shank 32 being flattened out or riveted over to hold the strip 29 firmly in place. Other means of anchoring the strip 29 may also be used. A clip 34 is connected to the outer end of the coil 27 and is slidably supported for movement longitudinally of the strip 29 in a slot 28 as indicated at 35 so as to hold one end of the coil 27 fixed from rotation but to permit coil expansion and contraction. As a result, variations in humidity which tend to expand and contract the coil 27, will cause rotation of the U-shaped bracket 23 about the pivot post 22.

Figure 1:
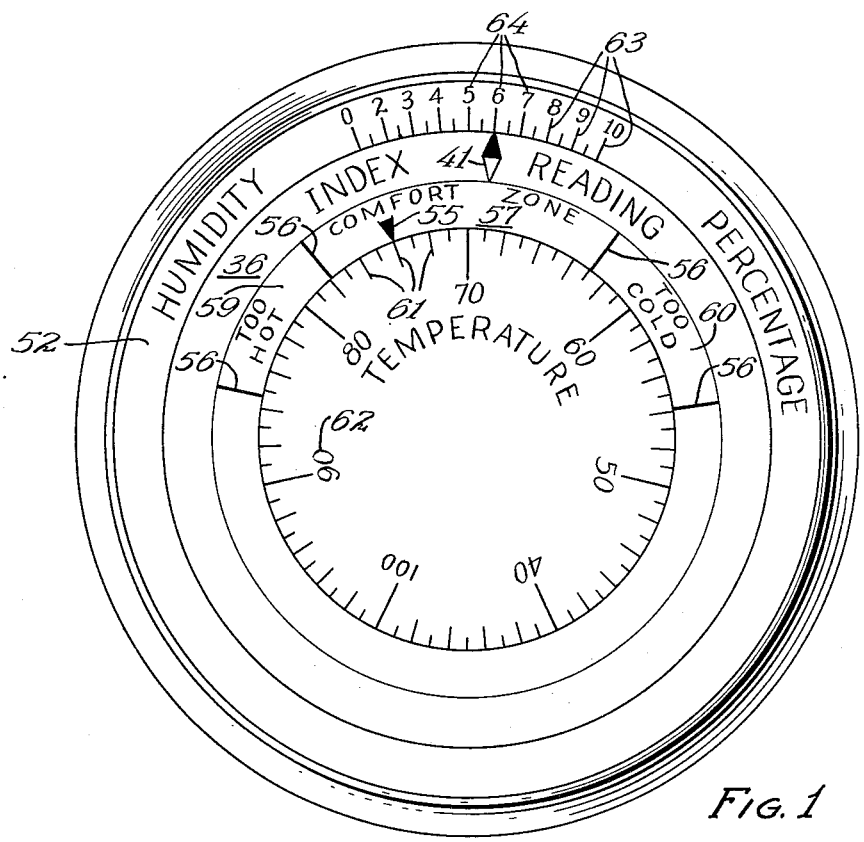
FIGURE 1 is a top plan view of the apparatus for indicating comfortable and uncomfortable ranges in temperature and humidity, showing the general arrangement of parts therein.

A disc which is indicated in general by the numeral 36 includes an outer substantially flat portion 37, an inverted substantially frusto conical portion 39, and a centrally downwardly offset portion 40 encircles the pivot post 2 and is anchored in any suitable manner to the upper surface of the U-shaped bracket 23. Thus rotation of the bracket 23 causes a similar pivotal movement of the disc 36. As indicated in FIGURE 1 of the drawings, the upper surface of the disc 36 is provided with a double ended indicating pointer 41, for a purpose which will be later set forth in detail.

The base portion 26 of the upper bracket 24 engages the inner end of a bimetallic coil 42. The outer end 43 of the coil 42 is provided with a radially extending arm 38 slidable in a slot in an L-shaped bracket 44 riveted or otherwise secured as at 45 to a boss 46 on the under side of the transparent cover 14. As a result, expansion and contraction of the coil 42 under variations in temperature will tend to pivot the U-shaped bracket 24 about the pivot shaft 22. A disc or dial 47 is anchored to the under side of the U-shaped bracket 24 and is rotated with this bracket upon variations in temperature.

The disc 47 includes an outer peripheral portion 49 lying closely beneath the transparent cover 14 or other scale dial, and includes a substantially frusto conical portion 50 which is coaxial with the similar portion 39 of the lower disc 36, and includes a substantially flat center portion 51 through which the pivot shaft 22 extends and to which the bracket 24 is secured.

While the discs 36 and 47 have been described as each having a concave center portion, these discs may be flat or but slightly dished, and used with cooperable scales within the casing and closely associated with the discs. The purpose of the construction disclosed is merely to closely relate the visible portions of the discs with their respective scales.

In the arrangement illustrated, a ring 52 of opaque material overlies the peripheral portion of the cover member 14 and a circular opaque area 53 preferably covers the center portion of the cover. These opaque portions 52 and 53 are thus separated by a transparent ring 54 through which the peripheral edges of the two discs 36 and 47 may be viewed. The peripheral edge of the inner disc 47 includes a pointer 55 and somewhat less than one-half the circumference of the disc 47 is divided by partition like lines 56 or by some other means such as by colors into a central area 57 and to outer areas 59 and 60. The central area 57 is provided with suitable indicia to indicate a so called comfort zone and the outer areas 59 and 60 bear indicia to indicate discomfort zones one of which is too hot and the other of which is too cold. In other words, the areas 57, 59 and 60 collectively constitute a comfort and discomfort scale.

The edge of the central opaque area 53 includes spaced indicating marks 61 printed or embossed thereon which indicate variations in temperature and this area also bears indicia such as 62 to provide a temperature scale. The inner edge of the outer opaque area 52 has a portion thereof divided by gauge marks 63 printed or embossed thereon and by indicia such as 64 to indicate variations in humidity. For example the numerals 0 to 10 may be employed to indicate from 0 percentage to 100 percent humidity.

The operation of the apparatus is extremely simple. The lower disc 36 is pivoted upon changes in the humidity, the pointer 41 being movable through the length of the scale provided by the gauge marks 63 to provide an indication of the existing humidity. The upper disc 47 is pivoted by variations in temperature, this disc rotating in counterclockwise direction as the temperature increases and pivoting in a clockwise direction as the temperature decreases. The pointer 55 cooperates with the gauge marks 61 to provide a temperature indication.

It will be noted that the double ended pointer 41 will remain within the limits of the comfort zone 57 at the 60 percent humidity reading illustrated until the pointer 55 indicates a temperature of perhaps 80 degrees. If the pointer 41 moves in a counterclockwise direction to indicate a lower humidity, the temperature can increase a number of degrees while the pointer 41 still remains in the comfort zone 57. However, if the outer disc 36 rotates in a clockwise direction so that the pointer 41 indicates nearly 100% humidity, the pointer 41 will move out of the comfort zone at a much lower temperature.

While the various proportions of the two scales and size of the zone may not be completely accurate, the manner in which the relative movement of the two indicators may provide an indication whether the existing conditions are comfortable to the normal person or not is believed obvious. When the temperature increases and the humidity decreases, a higher temperature may be considered comfortable. The two indicators operate to provide a relation between temperature and humidity which may be readily noted.

Figures 3, 4:
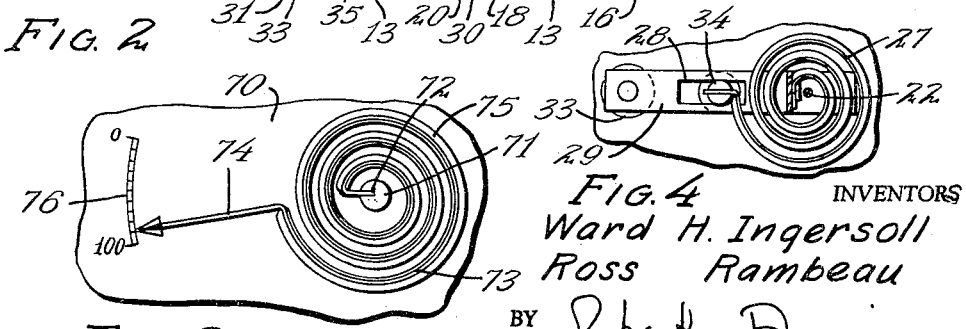
FIGURE 3 is a diagrammatic view showing a modified form of construction.
FIGURE 4 is a cross-sectional view on the line 4—4 of FIGURE 2.

In FIGURE 3 of the drawings I disclose a modified form of construction which is not indicated in complete form but which is illustrated somewhat diagrammatically as mounted upon a flat base 70. A fixed post 71 extends upwardly from the base 70 and supports the inner end 72 of a trimaterial coil 73 having an indicating pointer 74 secured to its outer end. The trimaterial coil 73 comprises two layers of metal having different coefficients of expansion, one of which is made with a coating 75 on one surface which is sensitive to variations in humidity and which tends to expand or contract with variations in the percentage of moisture in the air. The coil 73 is cooperable with a scale 76. Increases in temperature may tend to swing the pointer 74 in a clockwise direction and increases in humidity may tend to swing the pointer 74 in the same direction. Decreases in temperature and humidity tend to swing the pointer 74 in the opposite direction. Thus, as in the previously described structure, an increase in temperature may be offset by a decrease in humidity, and an increase in humidity may be offset by a decrease in temperature.

In accordance with the patent statutes, we have described the principles of construction and operation of our improvement in apparatus for indicating comfortable and uncomfortable ranges in temperature and humidity, and while we have endeavored to set forth the best embodiment thereof, we desire to have it understood that changes may be made within the scope of the following claims without departing from our invention.

We claim:

1. An apparatus for indicating comfortable and uncomfortable ranges of temperature and humidity and including a support, an indicator means, means pivotally supporting said indicator means on said support, a member sensitive to variations in temperature connected between said support and said indicator means to pivot said indicator means in one direction upon increases in temperature and in the opposite direction upon decreases in temperature, a second indicator means, means pivotally supporting said second indicator means in concentric relation to the first indicator means, means secured between said support and said second indicator means sensitive to variations in humidity and operable to rotate said second indicator means in said one direction upon decreases in humidity and in said opposite direction upon increases in humidity, and a comfort and discomfort scale on one of said indicator means and a cooperable indication on the other of said indicator means.

2. The structure of claim 1 and including a fixed temperature scale cooperable with said first indicating means and a fixed humidity scale cooperable with the other said indicator means.

3. An apparatus for indicating comfortable and uncomfortable ranges in temperature and humidity including a pair of concentric discs, means pivotally supporting said discs, a member sensitive to variations in temperature connected to one of said discs to pivot said disc in one direction upon increases in temperature and in the opposite direction upon decreases in temperature, a member sensitive to variations in humidity connected to the other of said discs to rotate the same in said one direction upon decreases in humidity and in the said opposite direction upon increases in humidity, a comfort and discomfort scale on one of said discs and a cooperable indicator on the other of said discs.

4. The structure of claim 3 and in which one of said discs projects beyond the other to provide a visible marginal portion.

5. The structure of claim 3 and including fixed scales adjacent each of said discs.

6. An apparatus for indicating comfortable and uncomfortable ranges in temperature and humidity including a coil of bimetallic material sensitive to variations in temperature to cause deflection of said coil in one direction upon an increase in temperature and in an opposite direction upon a decrease in temperature, a film of material sensitive to variations in humidity on a surface of said coil to cause deflection of said coil in said one direction upon increases in temperature and in said opposite direction upon a decrease in humidity, means anchoring one end of said coil, and an indicator connected to the other end thereof, whereby increases in temperature and humidity tend to move said indicator in one direction, and decreases in temperature and humidity tend to move the indicator in the opposite direction.

References Cited in the file of this patent

UNITED STATES PATENTS

| | | |
|---|---|---|
| 2,010,040 | Shurtleff | Aug. 6, 1935 |
| 2,874,571 | Hevener | Feb. 24, 1959 |

FOREIGN PATENTS

| | | |
|---|---|---|
| 444,274 | Great Britain | Mar. 18, 1936 |